July 28, 1953    W. E. SUMMERBELL    2,646,713
THREADLESS RETAINER
Filed Jan. 10, 1950
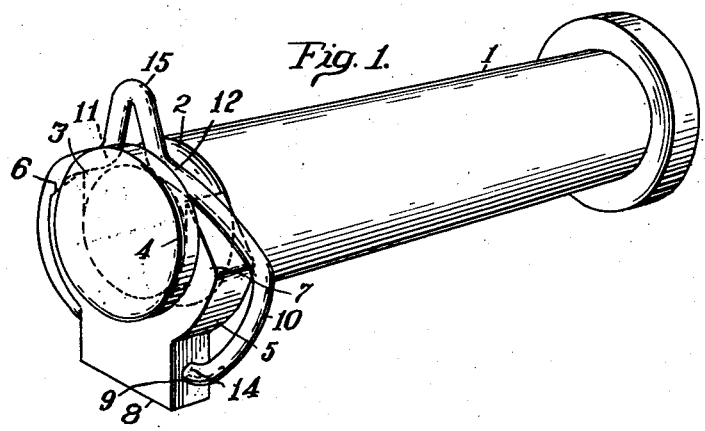
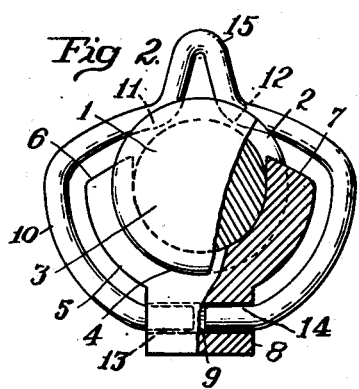 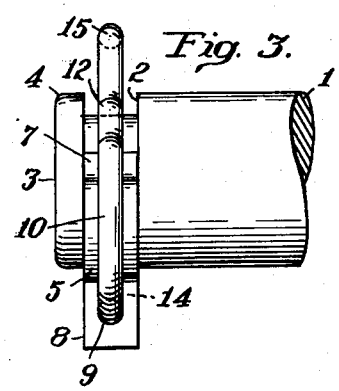
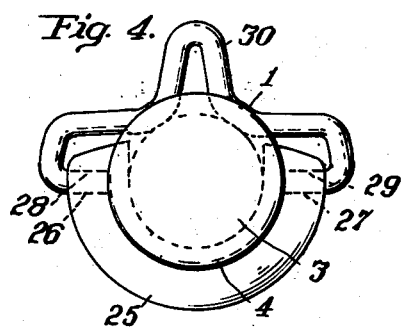 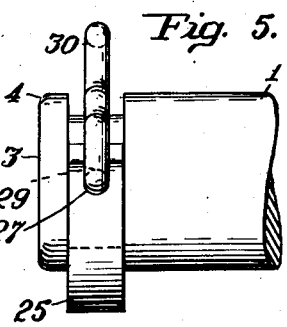
INVENTOR
William E. Summerbell
BY *Aalon B Kemon*
ATTORNEY Patented July 28, 1953

2,646,713

UNITED STATES PATENT OFFICE 2,646,713

THREADLESS RETAINER

William E. Summerbell, Washington, D. C.

Application January 10, 1950, Serial No. 137,751

4 Claims. (Cl. 85—8.8)

This invention relates to a threadless fastener or retainer for use in cooperation with a bolt, shaft, or other similar machine element, and more particularly to such a device which will retain various elements against longitudinal movement on a bolt or shaft, and which will also serve to retain a bolt or the like in fixed longitudinal relation with relation to a supporting structure.

The present invention is an improvement over the device shown and described in the U. S. patent to Summerbell, No. 2,402,693, which issued June 25, 1946. All the advantages of the threadless retainer shown in that patent are retained in the present device which is simplified in order to reduce manufacturing costs and which will occupy less space while supporting the same load.

Accordingly it is an object of the present invention to provide an improved threadless retainer of the type shown and described in the above mentioned patent which can be manufactured at lower cost and which is adaptable to a wide variety of applications.

Other objects will be apparent from the following description taken in conjunction with the accompanying drawings in which Figure 1 is a perspective view of my improved retainer in locked position on a bolt, Figure 2 is a front elevation partially in section of the device shown in Figure 1, Figure 3 is a side elevation of the same device, Figure 4 is a front elevation of a modification of the device shown in Figure 1, Figure 5 is a side elevation of the device shown in Figure 4.

Referring now to Figures 1, 2, and 3 of the drawing, 1 is a bolt or the like provided with a circumferential groove 2 near one end thereof. The end 3 is rounded at the edges as at 4 to facilitate locking the retainer in place as will be apparent from the description of the retainer proper which follows here.

The main load supporting portion of the retainer comprises a plate like member generally designated 5 which is bifurcated to provide two arms 6 and 7. The inner surface of the arms 6 and 7 is a major segment of a circle having a diameter substantially equal to that of the bottom of circumferential groove 2. The plate member 5 is adapted to fit in the groove 2 with the arms 6 and 7 in straddling relation to the bolt 1. The plate member 5 also includes a projecting lug like portion 8 having a bore 9 therein preferably substantially as shown.

To detachably support the plate member 5 in the groove 2, a spring member, generally designated 10, is provided. This spring member has portions 11 and 12 adapted to fit in that portion of groove 2 which is not occupied by the plate member 5. The ends 13 and 14 of the spring member are bent inwardly to be received in the bore 9. The spring also has an outwardly projecting handle portion 15 to facilitate locking and unlocking the retainer assembly on the bolt 1.

To lock the assembly on the bolt, the plate member is first inserted in the circumferential groove 2 with either of its wear faces facing the remote end of the bolt and the spring 10, hingedly secured to the plate member, is then wedged over the end of the bolt until it snaps into place in the position shown in the drawings. The load supporting plate 5 is thus firmly and rotatably secured in the groove 2. The load supporting surface becomes that portion of the plate 5 which is wholly within the groove. For any longitudinally acting loading to force the plate off, this entire area would have to be sheared. Thus it can be seen that a very substantial load can be carried.

The device shown in Figures 3 and 4 is identical in principle with that shown and described above, but the structure is slightly different.

The plate member 25 has a pair of bores 26 and 27 which are substantially coincident with a diameter of the bolt 1 when the plate is inserted in the groove 2. The spring member has ends 28 and 29 adapted to be received in these bores and a projecting handle portion 30 to facilitate locking and unlocking the retainer on the bolt.

From the above description it will be apparent that the retainer is not limited to use with a bolt as shown in the drawings, but also can be used on a wide variety of machine elements. For example, it can be used to retain a clevis pin within a clevis, thus avoiding the use of a screw fastener, cotter pin or similar locking devices. It can also be used to retain gear wheels on the change speed shafts of a lathe. Inasmuch as the device is equally effective throughout a large range of sizes, it has an almost infinite variety of applications.

I claim:

1. A threadless retainer assembly, for use on a bolt or the like having a single circumferential circular groove near one end thereof, comprising in combination: a bifurcated plate-like element the arms of which are adapted to engage within said groove in straddling rotatable relation to said bolt, said element having a pair of opposed wear faces; and a spring clip member carried by said plate element and adapted to be sprung or wedged over the end of said bolt with parts thereof entering and engaging with said groove opposite said furcation, and the whole of said member lying within the general plane of said plate element such that the over-all dimension of the assembly, axially of the bolt, is not greater than that of the said plate element, said plate element being symmetrical on opposite sides axially of said spring clip, whereby said plate element is rotatably retained within said groove in either of two positions to present either of said two wear faces to the opposite end of the bolt, the walls of said groove preventing axial movement of said plate, and said spring clip preventing lateral displacement of the plate from the groove at any radial position with respect to the bolt.

2. A threadless retainer as defined by claim 1 in which said plate element includes a lug like portion projecting away from and in the same plane as said arms and said spring clip member is pivotally mounted on said lug portion.

3. A threadless retainer as defined by claim 1 in which said spring clip member is pivotally mounted on said plate element adjacent the outer ends of said arms.

4. A threadless retainer assembly comprising in combination: a bolt or the like having a single circumferential circular groove near one end thereof; a bifurcated plate-like element the arms of which are adapted to engage within said groove in straddling rotatable relation to said bolt, said element having a pair of opposed wear faces; and a spring clip member pivotally carried by said plate element and adapted to be sprung or wedged over the end of said bolt with parts thereof entering said groove opposite the furcation, and the whole of said member lying within the general plane of said plate element such that the over-all dimension of the assembly, axially of the bolt, is not greater than that of the said plate element, said plate element being symmetrical on opposite sides axially of said spring clip, whereby said plate element is rotatably retained within said groove in either of two positions to present either of said two wear faces to the opposite end of the bolt, the walls of said groove preventing axial movement of said plate and said spring clip preventing lateral displacement of the plate from the groove at any radial position with respect to the bolt.

WILLIAM E. SUMMERBELL.

References Cited in the file of this patent

UNITED STATES PATENTS

| Number | Name | Date |
|---|---|---|
| 684,664 | Anderson | Oct. 15, 1901 |
| 2,402,693 | Summerbell | June 25, 1946 |